(12) United States Patent
Barros Da Silva et al.

(10) Patent No.: US 10,687,068 B1
(45) Date of Patent: Jun. 16, 2020

(54) METHOD FOR COMPRESSING LIGHT FIELD DATA USING VARIABLE BLOCK-SIZE FOUR-DIMENSIONAL TRANSFORMS AND BIT-PLANE DECOMPOSITION

(71) Applicants: SAMSUNG ELETRÔNICA DA AMAZÔNIA LTDA., Campinas, São Paulo (BR); UNIVERSIDADE FEDERAL DO RIO DE JANEIRO, Rio de Janeiro (BR)

(72) Inventors: Eduardo Antônio Barros Da Silva, Rio de Janeiro (BR); Murilo Bresciani De Carvalho, Rio de Janeiro (BR); Carla Liberal Pagliari, Rio de Janeiro (BR); Marcio Pinto Pereira, Rio de Janeiro (BR); Gustavo De Oliveira E Alves, Rio de Janeiro (BR); Fernando Manuel Bernardo Pereira, Lisbon (PT); Vanessa Testoni, Campinas (BR); Pedro Garcia Freitas, Campinas (BR)

(73) Assignees: SAMSUNG ELETRÔNICA DA AMAZÔNIA LTDA., Campinas, São Paulo (BR); UNIVERSIDADE FEDERAL DO RIO DE JANEIRO, Rio de Janeiro (BR)

( * ) Notice: Subject to any disclaimer, the term of this patent is extended or adjusted under 35 U.S.C. 154(b) by 0 days.

(21) Appl. No.: 16/380,600

(22) Filed: Apr. 10, 2019

(30) Foreign Application Priority Data

Jan. 16, 2019 (BR) .......................... 102019000922

(51) Int. Cl.
H04N 19/176 (2014.01)
H04N 19/147 (2014.01)
H04N 19/124 (2014.01)

(52) U.S. Cl.
CPC ......... *H04N 19/176* (2014.11); *H04N 19/124* (2014.11); *H04N 19/147* (2014.11)

(58) Field of Classification Search
CPC ... H04N 19/176; H04N 19/147; H04N 19/124
See application file for complete search history.

(56) References Cited

U.S. PATENT DOCUMENTS

| 5,315,670 A | 5/1994 | Shapiro |
| 5,321,776 A | 6/1994 | Shapiro |
| 5,412,741 A | 5/1995 | Shapiro |

(Continued)

*Primary Examiner* — Shawn S An

(57) ABSTRACT

A method for compressing light field data using variable block-size four-dimensional transform and bit-plane hexadeca-tree decomposition, the method including: partitioning a four-dimensional pixel data of a light field into four-dimensional blocks of independent fixed size; partitioning the four-dimensional blocks in a set of four-dimensional non-overlapping sub-blocks of different sizes according to a rate-distortion criterion; independently transforming the four-dimensional sub-blocks generated in the previous operation, using a four-dimensional transform; quantizing by bit-planes the sub-blocks transformed by the four-dimensional transform according to Rate-Distortion optimized hexadeca-tree structure; and encoding the four-dimensional quantized data generated through an arithmetic encoder to produce a compressed representation of the light field.

8 Claims, 9 Drawing Sheets

(56) References Cited

U.S. PATENT DOCUMENTS

| | | |
|---|---|---|
| 5,867,602 A | 2/1999 | Zandi et al. |
| 5,966,465 A | 10/1999 | Keith et al. |
| 6,263,110 B1 | 7/2001 | Andrew et al. |
| 6,266,414 B1 | 7/2001 | Bradley et al. |
| 6,389,074 B1 | 5/2002 | Andrew |
| 2002/0006164 A1* | 1/2002 | Felts .................... H04N 19/647 375/240.19 |
| 2004/0114807 A1 | 6/2004 | Lelescu et al. |
| 2004/0252834 A1* | 12/2004 | Nishimura ........... H04N 7/1675 380/201 |
| 2014/0232822 A1 | 8/2014 | Venkataraman et al. |
| 2015/0201176 A1 | 7/2015 | Graziosi et al. |

* cited by examiner

METHOD FOR COMPRESSING LIGHT FIELD DATA USING VARIABLE BLOCK-SIZE FOUR-DIMENSIONAL TRANSFORMS AND BIT-PLANE DECOMPOSITION

CROSS-REFERENCE TO RELATED APPLICATION

This application is based upon and claims the benefit of priority of the prior Brazilian Patent Application No. 10 2019 000922 5, filed Jan. 16, 2019, the entire contents of which are incorporated herein by reference.

FIELD

The present invention relates to a method for compressing light field data using variable block-size four-dimensional transforms and hexadeca-tree bit-plane decomposition.

BACKGROUND

In recent years, with the increase of visual information in digital format, there is a growing need for more immersive application, demanding better representations of light in the space. A full description of the light rays present in the space is provided by the Plenoptic Function, a theoretical vector function with 7 dimensions (7D) that could describe the light intensity passing through every viewpoint, in each direction, for every wavelength, and for every time instant. By restricting the spectral information components, it is assumed no variation in time and it is considered the intensity of each light ray as being constant along its path, the 7D function can be simplified to a four-dimensional (4D) representation, which is called the light field.

The light field is among the most efficient ways of representing three-dimensional (3D) naturalness of visible reality. It has become a great trend for being used in many images applications, including high-resolution microscopy, computer vision, velocimetry, health, and more. For instance, Google has been investing in light field technologies for applications with an extremely high-quality sense of presence by producing motion parallax and extremely realist textures and lighting. Moreover, a recent marketing research report entitled "*Light field market by technology (imaging solution, display), vertical (healthcare and medical, defense and security, media and entertainment, architecture and engineering, industrial), and geography-global forecast to 2023*" has announced that the light field market was valued at USD 924.7 Million in 2018 and is expected to reach USD 1,822.3 Million (>USD 1 Billion) by 2023, at a compound annual growth rate (CAGR) of 14.5% between 2018 and 2023. These remarkable amounts are driven by AR/VR industries, game developers, 3D animation vendors, 3D robotics, Industry 4.0, and movie industry.

Considering the demand of the industry for light fields technologies, it is expected a huge growth of light field content and the consequent increase of the generated light field data. Moreover, because light fields are able to capture the intensity of objects and record information of light rays, there is a generation of a massive amount of data during light field imaging, which implies in a large storage consumption. Therefore, anticipating both high demand for light field contents and high volume of light field data that will be produced, the Joint Picture Experts Group (JPEG) standardization committee has issued a call for proposal (CfP) on light field coding technologies, called JPEG Pleno.

JPEG Pleno is a standardization activity launched in 2014. Its goal is to create a standard framework for efficient storage and transmission of plenoptic imaging (light field, point-cloud, and holographic contents). In particular, JPEG Pleno aims to find an efficient way to represent plenoptic content. A call for proposals for compressing light fields obtained from both lenslet and high-density cameras, aiming at the definition of a standard for compression of plenoptic content, has been issued during the 73rd JPEG Meeting, ISO/IEC JTC 1/SC29/WG1 JPEG, "*JPEG Pleno call for proposals on light field coding*" (Doc. N73013, Chengdu, China, October 2016). Among the proposals submitted to the committee, the following three proposals provided the best performances:

1) Zhao et al., "*Light field image coding via linear approximation prior*" (in IEEE International Conference on Image Processing 2017-Light Field Coding Grand Challenge, Beijing, China, September 2017);
2) Tabus et al., "*Lossy compression of lenslet images from plenoptic cameras combining sparse predictive coding and JPEG 2000*" (in IEEE International Conference on Image Processing 2017-Light Field Coding Grand Challenge, Beijing, China, September 2017);
3) Graziozi et al, patent application US 2015/0201176 A1, entitled "*Methods for Full Parallax Compressed Light Field 3D Imaging Systems*".

The proposal of Zhao et al divides the light field view images into two complementary sets. The views in the first set are converted to a pseudo video sequence to be lossy compressed by a video compressor, like HEVC. The decoded views are then used as references to encode the second set of views. For each view in the second set a predicted view is created as being a linear combination of the reference views from the first set. The difference between the original views and the respective predicted ones is evaluated resulting in a set of residue views. These residue views are then encoded using the JPEG standard. This method can be employed to attain both lossy and lossless compression.

The proposal of Tabus et al presented a lenslet image compression method that is scalable from low bitrates to fully lossless bitrates. The lenslet dataset is also partitioned into two sets: the reference sub-aperture images (views) that are encoded using the JPEG2000 standard and a set of dependent views that are reconstructed from the reference views. Their reconstruction is performed by employing flexible interpolators implemented by sparse predictors. These are based both on the scene geometry extracted from the depth maps and the geometry of the micro lens array. In addition to the reference views, the depth map is encoded along with the displacement vectors and the coefficients of the sparse predictors from each region.

The proposal of Graziozi et al. attempted to find an optimal subset of light field samples to be encoded, while the remaining samples are generated using multi-reference depth-image based rendering.

Differently from the above proposals, this invention brings a new competitive way of encoding light fields to the JPEG Pleno standardization activities. The method of the present invention interprets the whole light field data in its native four-dimensional form, while the others employ scanning procedures to reduce the four-dimensional light field to a sequence of two-dimensional views. In them, a sequence of views can be directly encoded by a video codec, or some views are chosen as references while others are synthesized as linear combinations of possibly warped versions of the reference images. The methods that rely on warping have the disadvantage of depending on depth or disparity maps besides they are not always available. Moreover, depth map depending methods may not be robust and require high computational cost. Further, the quality of the maps has enormous influence on the performance of the compression method. The present invention, on the other hand, uses four dimensional transforms to explore the interview redundancy and achieves very competitive results.

The following solutions and technologies are found in the prior art:

The paper entitled "*A Study on the 4D Sparsity of JPEG Pleno Light Fields Using the Discrete Cosine Transform*", by G. Alves, M. P. Pereira, M. B. Carvalho, F. Pereira, C. L. Pagliari, V. Testoni, and A. da Silva, in 25th IEEE International Conference on Image Processing (ICIP), pp. 1148-1152, 2018, presents an exploratory analysis of the 4D sparsity of light fields in the 4D-DCT space. This paper was developed to investigate the suitability of 4D-DCT for compressing both lenslets-based and High-Density Two-dimensional Camera Array (HDCA) JPEG Pleno datasets. In this paper, the results disclose that the lenslet datasets exhibit high 4D redundancy, with a larger inter-view sparsity than the intra-view one. For the HDCA datasets, there is also 4D redundancy worthy to be exploited, yet in a smaller degree. Unlike the lenslets case, the intra-view redundancy is much larger than the inter-view one. The paper was a first investigation concerning the suitability of 4D transforms for light field coding. However, differently from the present invention the paper did not disclose a complete codec.

The paper entitled "*The 4D DCT-Based Lenslet Light-Field Codec*" by M. B. Carvalho, M. P. Pereira, G. Alves, E. A. da Silva, C. L. Pagliari, F. Pereira, V. Testoni, on 25*th IEEE International Conference on Image Processing (ICIP)*, pp. 435-439, 2018, proposes a preliminary light field codec that fully exploits the 4D redundancy of the light field data by using the 4D discrete cosine transform (DCT) and encoding of coefficients using bit-planes and hexadeca-tree-guided partitioning. However, this paper does not disclose all the features of the present invention. The paper partitions the four-dimensional light field using fixed-size blocks and encodes each of them with four-dimensional DCTs. The present invention uses a four-dimensional variable block-size partitioning structure, whereby a 4D hyper-rectangular region is either transform coded as it is or is partitioned into four hyper-rectangular sub regions in the spatial dimension or is partitioned into 4 hyper-rectangular regions in the views dimension. Also, in the paper, the hexadeca-tree partition is signaled by a binary flag that indicates whether a four-dimensional block is partitioned into 16 fixed hyper-rectangles, and the partition is determined always only by the magnitude of the coefficients. However, the present invention signals the optimized hexadeca-tree partition using a ternary flag where the encoding decisions are made by Lagrangian optimization based on a rate-distortion (R-D) criterion.

The paper "*Lossy Compression of Lenslet Images from Plenoptic Cameras Combining Sparse Predictive Coding and JPEG* 2000", by I. Tabus, P. Helin, P. Astola, 24*th International Conference on Image Processing (ICIP)*, pp. 4567-4571, 2018, describes a method for compressing light field data by selecting some reference views and making use of disparity maps and views synthesis that is refined by 4 four-dimensional sparse predictors. Differently, the invention proposed on this document compresses light field data using a four-dimensional block transform that does not rely on either depth maps or view synthesis.

Patent document EP 0855838 A2 entitled "A method for digital image compression using Discrete Wavelet Transform DWT" filed on Jul. 29, 1998, by CANON INFORMATION SYST RESEARCH AUSTRALIA PTY LTD, proposes an image encoding algorithm that encodes the positions of the non-zero transform coefficients of an image (2D) using the discrete wavelet transform and quadtrees, that is the recursive division of a rectangular image (2D) region into 4 rectangular image (2D) regions. The present invention encodes the positions of the non-zero coefficients of a four-dimensional (4D) transform of a light field (4D) using hexadeca-trees. That is, the recursive division of four-dimensional regions (4D hyperrectangles) into 16 four-dimensional hyperrectangles. On Claim 1, patent document EP0855838A2 informs that the method is to represent a digital image (a two-dimensional array of pixels), but the present invention is to represent a light field (a four-dimensional tensor). On Claim 2, patent document EP0855838A2 informs the use of a two-dimensional discrete wavelet transform, but this invention uses a four-dimensional transform. On Claim 11, patent document EP0855838A2 informs that each bit-plane of a two-dimensional region is scanned recursively, but this invention may either scan the bit-planes of a 4D region or mark the entire 4D region as discarded (all coefficients set to zero) if a rate-distortion criterion is met, which is equivalent to encode the positions of the non-zero coefficients in a lossy manner according to a rate-distortion criterion.

Patent U.S. Pat. No. 6,263,110 B1 entitled "Method for compression data", filed on Sep. 29, 1998, by Canon Kabushiki Kaisha, proposes an image coding algorithm that encodes the positions of the data coefficients transformed into wavelets a non-null image (2D) using quadtrees, which is the recursive division of a rectangular image region into 4 rectangular image (2D) regions. The present invention encodes the positions of non-zero coefficients of four-dimensional transform of a light field using hexadeca-trees, which is the recursive division of four-dimensional regions (hyper-rectangles) into 16 four-dimensional hyper-rectangles. It is worth to emphasize that patent U.S. Pat. No. 6,263,110 B1 discloses the use of a two-dimensional (2D) discrete wavelet transform, but the present invention uses a four-dimensional (4D) block transform. Patent U.S. Pat. No. 6,263,110 B1 describes a method for compressing digital 2D images, but the present invention is conceived to compress the 4D light field data. The patent document U.S. Pat. No. 6,263,110 B1 sets n to claims 3 and 4, a method to round the coefficients of a region at a minimum bit-plane, but the present invention uses the same minimum bit-plane for the whole light field and in addition may either scan the bit-planes of a region or mark the entire region as discarded (all coefficients set to zero) if a rate-distortion criterion is met, which is equivalent to encode the positions of the non-zero coefficients in a lossy manner according to a rate-distortion criterion. The patent document U.S. Pat. No. 6,263,110 B1 defines on its claim 5 the use of a two-dimensional discrete wavelet transform, but the present invention uses a four-dimensional (4D) block transform. On Claim 6, patent document U.S. Pat. No. 6,263,110 B1 defines that the method is to represent a digital image (a two-dimensional array of pixels), but the method of the present invention is to represent a light field (a four-dimensional array of pixels)

The patent document U.S. Pat. No. 6,266,414 B1 entitled "Method for digital data compression", filed on Sep. 29, 1998, by Canon Kabushiki Kaisha, proposes an image encoding algorithm that encodes the positions of the non-zero transform coefficients of an image (2D) using quadtrees, that is equivalent to the recursive division of a rectangular image region into 4 rectangular image (2D) regions. The present invention proposes the encoding of the positions of the non-zero coefficients of a four-dimensional (4D) transform of a light field using hexadeca-trees that represents the recursive division of four-dimensional regions (hyperrectangles) into 16 four-dimensional hyperrectangles. The patent document U.S. Pat. No. 6,266,414 B1 defines on its claim 1 the use of wavelet decomposition, but the present invention uses a four-dimensional (4D) block transform. On Claim 21, patent document U.S. Pat. No. 6,266,414B1 defines that the method is to represent a digital image (a two-dimensional array of pixels), but the present invention is to represent a light field (a four-dimensional (4D) array of pixels).

Patent document U.S. Pat. No. 6,389,074 B1 entitled "Method and apparatus for digital data compression", filed on Sep. 28, 1998, by Canon Kabushiki Kaisha, proposes an image encoding algorithm that encodes the positions of the non-zero transform coefficients of an image (2D) using quadtrees and also proposes the use of Lagrangian optimization to find the optimum quadtree partition that encodes the positions of non-zero transform coefficients of an image, video or frame difference data, in a rate-distortion sense, but the present invention proposes the use of Lagrangian optimization to find the optimum hexadeca-tree partition in order to locate the non-zero transformed coefficients in the 4D light field data. On Claim 1(a), patent document U.S. Pat. No. 6,389,074 B1 defines the use of discrete wavelet transform, but the present invention uses a four-dimensional (4D) block transform. On Claim 1 (b), patent document U.S. Pat. No. 6,389,074 B1 defines the use of variable quantization with a quantization factor, but the present invention uses the same number of bit-planes (equivalent to the quantization factor) for the whole light field. In addition, the invention proposed herein may either scan the bit-planes of a region or mark the entire region as discarded (all coefficients set to zero) if a rate-distortion criterion is met, which is equivalent to encode the positions of the non-zero coefficients in a lossy manner according to a rate-distortion criterion. On Claims 6, 7 and 8, patent document U.S. Pat. No. 6,389,074 B1 defines that input data can be two-dimensional image data, two-dimensional video data or two-dimensional video frame difference data, but the present invention is for light field data, which consist of four-dimensional data.

The patent documents U.S. Pat. No. 5,315,670 A entitled "Digital data compression system including zerotree coefficient coding", U.S. Pat. No. 5,321,776 A entitled "Data compression system including successive approximation quantizer", U.S. Pat. No. 5,412,741 A entitled "Apparatus and method for compressing information", GB 2303030 A entitled "Data compression using reversible wavelet transforms and an embedded codestream", U.S. Pat. No. 5,867,602 A entitled "Reversible wavelet transform and embedded codestream manipulation" and U.S. Pat. No. 5,966,465 A entitled "Compression/decompression using reversible embedded wavelets" propose two-dimensional image encoding algorithms that use zero-trees to encode the positions of the non-zero coefficients of regions within an image. The present invention proposes the encoding of the positions of the non-zero coefficients of a four-dimensional (4D) transform of a light field using hexadeca-trees, that is equivalent to the recursive division of four-dimensional regions (hyperrectangles) into 16 four-dimensional hyperrectangles. On Claim 1 from patent document U.S. Pat. No. 5,315,670 A, Claim 1 from patent document U.S. Pat. No. 5,321,776 A, Claim 1 from patent document U.S. Pat. No. 5,412,741 A, Overview of The System of Present Invention, FIG. 1 and Applications from patent document GB 2303030 A, Overview of the Present Invention from U.S. Pat. No. 5,867,602 A and Claim 8 from patent document U.S. Pat. No. 5,966,465 A, it is informed that they target the representation of two-dimensional image data (a two-dimensional array of pixels), but the present invention is targeted at representing four-dimensional light field data. On Claim 1 from patent document U.S. Pat. No. 5,315,670 A, Claim 1 from patent document U.S. Pat. No. 5,321,776A, Claim 1 from patent document U.S. Pat. No. 5,412,741 A, "Coefficient Trees" section from patent document GB 2303030 A, "Coefficient Trees" section from U.S. Pat. No. 5,867,602 A and "Overview of The Present Invention" from patent document U.S. Pat. No. 5,966,465 A, there is a description of the zero-tree as a structure composed of a zero wavelet transform coefficient at a coarse level of information as a root to zero wavelet transform coefficients at the corresponding positions at all the finer levels of the wavelet transform coefficients (sub bands), but the present invention uses blocks of transform coefficients arranged in a hierarchical four-dimensional structure in the space-view called hexadeca-tree. On "Detailed Description" from patent document U.S. Pat. No. 5,315,670 A, "Detailed Description" from patent document U.S. Pat. No. 5,321,776 A, "Detailed Description" from patent document U.S. Pat. No. 5,412,741 A, "The Encoding and Decoding Process of Present Invention" section from patent GB 2303030 A, "Parser" section from patent document U.S. Pat. No. 5,867,602 A and "Detailed Description" from patent document U.S. Pat. No. 5,966,465 A, the patents inform the coding of coefficients for all wavelet transform levels according to a bit-plane scanning order until the available bit budget is exhausted or the entire image is coded, but this invention scans the coefficients up to a minimum bit-plane, determined using a rate-distortion (R-D) criterion valid for the whole light field and in addition may either scan the bit-planes of a 4D region or mark the entire 4D region as discarded (all coefficients set to zero) according to the same rate-distortion criterion, which is equivalent to encode the positions of the non-zero coefficients in a lossy manner according to this rate-distortion criterion.

Patent document US 20040114807 A1, entitled "Statistical representation and coding of light field data" filed on Jun. 17, 2004, by Lelescu et al, proposes the use of a two-dimensional Statistical Analysis Transformation in each view to represent and compress a light field. This is essentially a two-dimensional transformation of each view alone, whose basis functions are computed using the Principal Component Analysis (PCA) based upon the estimation of the autocorrelation function of the stochastic process consisting of views of the light field. This two-dimensional transformation is used to reduce the dimensionality of each view prior to encoding, but the present invention computes a four-dimensional block transform of the whole light field and encodes the positions of the non-zero coefficients of this four-dimensional block transform using hexadeca-trees, that are equivalent to the recursive division of four-dimensional regions (hyperrectangles) of light field coefficients into 16 four-dimensional hyperrectangles. On Claim 3, patent document US20040114807A1 defines the use of Principal Component Analysis PCA), but the present invention uses a four-dimensional block transform.

Patent document US 20140232822 A1 entitled "Systems And Methods For Generating Compressed Light Field Representation Data Using Captured LightFields, Array Geometry, And Parallax Information" filed on Aug. 21, 2014, by Pelican Imaging Corporation, proposes the compression of a light field using a view prediction scheme employing reference images and depth map information. In the present invention there is no view prediction step and a four-dimensional transform is applied directly to 4D-blocks of the 4D light field. In the patent document US 20140232822 A1 the views are reconstructed using pixel interpolation and the residual information generated by the prediction process, but in the present invention there is no need for prediction, pixel interpolation or use of depth maps. On Claim 1, the patent document US 20140232822 A1 defines the use of depth maps to guide the interpolation of the intermediate views, but the present invention encodes the whole light field data using a four-dimensional block transform, and thus does not rely on depth maps.

Patent document US 20150201176 A1 entitled "Methods for Full Parallax Compressed Light Field 3D Imaging Systems", filed on Jul. 16, 2015, by OSTENDO TECHNOLOGIES INC, proposes a method for compressing light field data using depth-image based rendering (DIBR), enabled by a selected set of reference views, depth maps and view synthesis through warping schemes, but the present invention compresses light field data using a four-dimensional block transform of the light field, and does not rely on either depth maps or view synthesis. On Claim 10, the patent document US 20150201176 A1 defines that it uses selected views as references but the present invention encodes the whole light field data using a four-dimensional block transform. On Claim 11, the patent document US 20150201176 A1 defines the use of depth maps to guide the interpolation of the intermediate views, but the present invention encodes the whole light field data using a four-dimensional block transform, and thus does not rely on depth maps. On Claims 12 and 17, the patent document US 20150201176 A1 defines the use of depth-image based rendering to interpolate intermediate views based on warping, but the present invention encodes the whole light field data using a four-dimensional block transform, and thus does not need to render intermediate views.

The patent documents WO 2016090568 A1 entitled "Binary tree block partitioning structure" filed on Jun. 16, 2016, by MEDIATEK SINGAPORE PTE LTD, and WO 2016091161 A11 entitled "Method of video coding using binary tree block partitioning" proposes a two-dimensional block partition structure for coding of two-dimensional images and two-dimensional videos called QuadTree plus Binary Tree (QTBT), but the present invention uses a four-dimensional block partitioning structure for light field coding whereby a four-dimensional hyperrectangular region is either transform coded as it is, or is partitioned in 4 hyperrectangular sub regions in the spatial dimension or is partitioned in 4 hyperrectangular regions in the views dimension. This partition is encoded as a quadtree structure using a ternary flag signaling the transformation without segmentation, or the spatial dimension segmentation, or the views dimension segmentation, optimized based on a rate-distortion criterion computed using Lagrangian optimization. On Claim 1 of patent document WO2016090568A1 and on Claim 1 of patent document WO2016091161A11, it is informed that the method is for two-dimensional image or video coding, but the present invention is for four-dimensional light field data.

SUMMARY

The present invention introduces a method and system for removing redundant information from light field data, reducing the amount of bits to represent the pixels of the light field, and by making the light field data more suitable for transferred through a medium with limited bandwidth. The present invention adds value to any system which makes use of imaging resources by introducing a new method for compressing light fields.

One embodiment of the present invention is to composed of a user of an AR/VR device and a web server that delivers light field content, both equipped with features described in the present invention. The streaming server must compress the light field data in order to transmit it through the medium. On the other side, the AR/VR device must be able to decompress the transmitted data and depicts it to the user. Another embodiment consists of a mobile phone with light field camera. Mobile phones with light field cameras improve the devices by enabling resources such as increased immersive captured scenarios and refocusing after picture is taken.

The present invention compresses the light fields by exploiting its overall 4D redundancy using a 4D transform. This redundancy is particularly high when the light fields are densely sampled. Therefore, the present invention is efficient for densely sampled light fields, such as the ones acquired using light field cameras (for example, Raytrix and Lytro).

As the present invention is based on the 4D transform, it does not rely on the computation of depth fields, necessary for the view synthesis procedure used in most of the prior art light field compression methods. Therefore, this four-dimensional based representation is conspicuous advantage to rendering light fields on the receiver side.

Since different regions of the light field may have objects at different depths, the amount of disparity among different light field views may vary. This implies that the 4D redundancy of different light field regions may vary accordingly. In order to effectively explore these different amounts of 4D redundancy, the present invention uses transforms with variable block-sizes. The adaptation is achieved by a Rate-Distortion (R-D) optimized 4D-block partitioning scheme, whereby the encoding algorithm evaluates the cost of encoding a 4D-block (using 4D transform and hexadeca-tree decomposition), against the one of recursively encoding each of the 4 blocks resulting from the partition along the spatial dimension or of recursively encoding each of the 4 blocks resulting from the partition along the views dimension. The partition with the smallest coding cost is chosen using Lagrangian optimization.

The quantization is performed by bit-planes and rely on an R-D optimized hexadeca-tree structure which is recursively built following three different operations: encoding the bit-plane immediately below without performing a new partitioning, partitioning the block in the same bit-plane or discarding the block.

In the last stage, an entropy encoder is applied to produce the final compressed representation of the light field data.

The present invention brings to the market a new competitive way of encoding whole light fields data that uses variable block-size four-dimensional (4D) transform and hexadeca-tree bit-plane decomposition. This approach proposes a novel solution where the other solutions rely on prediction based in depth maps and view synthesis supported by warping schemes. The present invention also brings random access in the four-dimensional block level as advantage over the prior art.

More specifically, the present invention relates to method for compressing data field light using variable block-size four-dimensional transforms and hexadeca-tree bit-plane decomposition, comprising the steps of:

a) partitioning the four-dimensional pixel data of the light field into four-dimensional blocks of independent fixed size;

b) partitioning the four-dimensional blocks in a set of four-dimensional non-overlapping sub-blocks of different sizes according to a rate-distortion criterion;

c) independently transforming the four-dimensional sub-blocks generated in the previous step, using a four-dimensional transform;

d) quantizing by bit-planes the sub-blocks transformed by the four-dimensional transform according to Rate-Distortion optimized hexadeca-tree structure; and e) encoding the four-dimensional quantized data generated through an arithmetic coder to produce a compressed representation of the light field (306).

Some of the advantages of the present invention are listed below:

1. Ability to fully exploit 4D redundancy: The invention is based on 4D transforms that are able to fully exploit 4D redundancy present on light field data that tends to be large for the case of densely sampled light fields, such as the ones generated by light field cameras (e.g., Raytrix and Lytro).

2. Dispensability additional depth information: Most of the prior art solutions for light field compression are based on the coding of reference views typically followed by the prediction/estimation of intermediate views using depth map-based image rendering. These solutions exploit intra- and inter-view redundancies in separated steps and thus the overall 4D redundancy of the light fields tends not to be fully exploited. In addition, the prediction/estimation of views from such methods usually requires additional input data such as depth information of the scene. This fact makes the performance of these methods dependent of the quality of depth estimation and rendering techniques. The present invention does not involve any rendering step and does not rely on any depth information.

3. Uniform quality of views and better user quality of experience: Light field coding solutions based on view rendering usually produce a set of decoded views with non-uniform quality. This characteristic may result in poor user quality of experience for most applications of light fields. The present invention, since is based on a 4D transform applied to the whole light field, tends to produce a decoded light field with uniform distribution of quality among views and, therefore, a better user quality of experience.

4. Random access: The present invention is a block-based scheme where 4D blocks of pixels are encoded independently. This characteristic together with the employed non-predictive coding approach provides a good balance between two opposing requirements of coding of light fields, which are to achieve high Rate-Distortion performance while minimizing dependencies between the various views. Therefore, the present invention allows the extraction of several regions of interest without the need of decoding the entire compressed representation of the light field, providing random access to parts of the light field, such as a group of pixels from all views or a single view.

5. Data parallelization: Differently of other light field codec proposes, the block-wise model of the present invention provides parallel scalability.

6. Standard adoption: The present invention is highly expected to be adopted by the JPEG Pleno standard which covers several market segments, such as AR/VR, gaming, 3D animation vendors, immersive displays and movies.

BRIEF DESCRIPTION OF DRAWINGS

The present invention will become clearer from the following detailed description of exemplary and non-limitative drawings presented at the end of this document.

DESCRIPTION OF EMBODIMENTS

Figure 1:
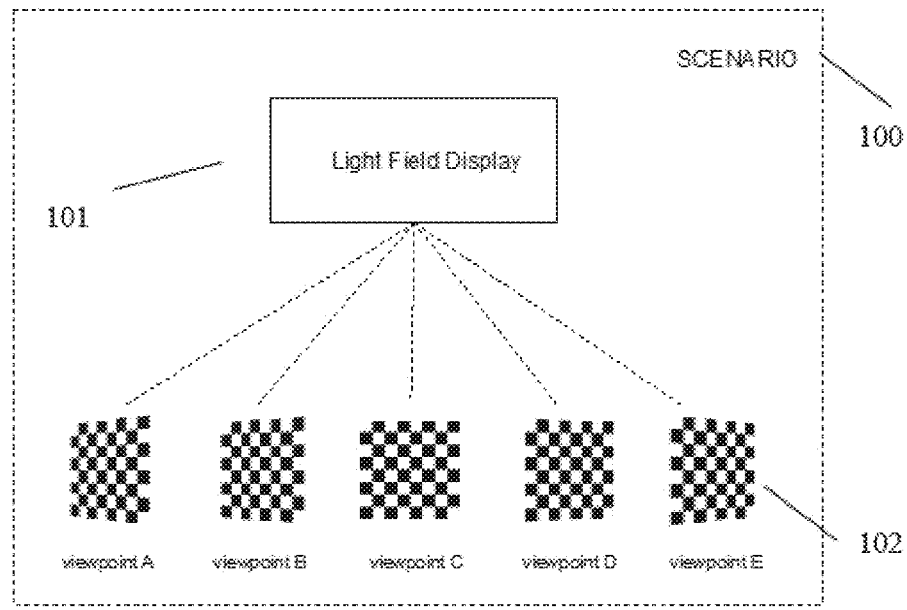
FIG. 1 depicts a sample embodiment of the Light Field Display Application.

The detailed description of this invention follows a top-down approach. It begins with FIG. 1, which describes a sample embodiment exemplifying one use of the invention. It provides an immersive 3D experience (100) by using a light field display (101), where it is possible to watch the same content from 5 different viewpoints (102). In a typical real-life application, the number of viewpoints would be much larger (e.g. 101×21 or 13×13 viewpoints), thus corresponding to a huge amount of data. This requires very efficient compression schemes, such as the one from the present invention.

Figure 2:
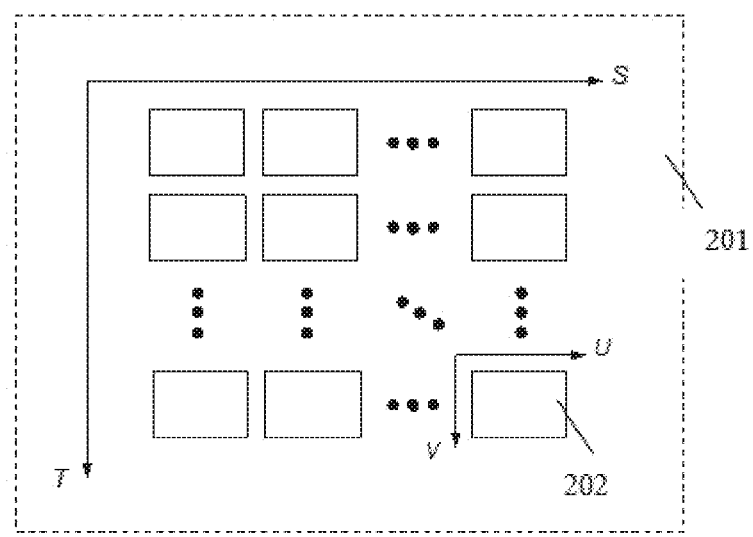
FIG. 2 discloses a light field dataset and its 4 dimensions.

Light field datasets are composed of 4D light fields of dimensions (T×S×V×U). The views are addressed by the (T,S) coordinates pair (201), while the (V,U) pair (202) addresses a pixel within each (T,S) view, as depicted in FIG. 2.

Figure 3:
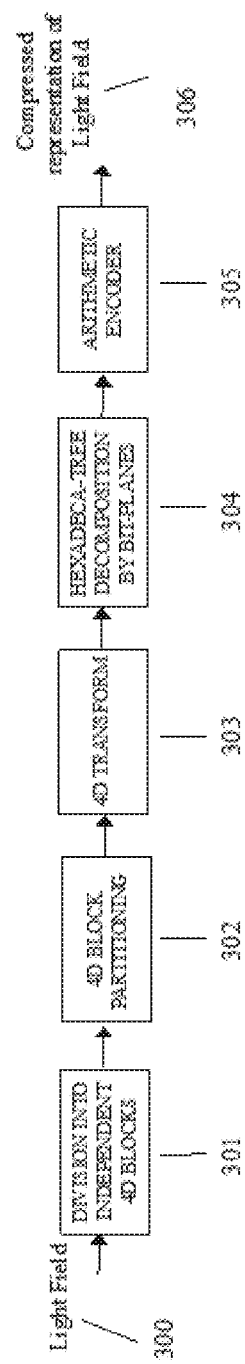
FIG. 3 discloses the encoder block diagram.

The light fields compression method described in the present invention is composed of 5 main modules, as illustrated in FIG. 3. The light field four-dimensional pixel data (300) is divided into fixed size 4D blocks (301) that will be independently encoded. This process is followed by a partition of the block into a set of non-overlapping 4D sub-blocks of different sizes (302), with the optimum partition chosen according to an R-D criterion. Each sub-block is independently transformed by a four-dimensional transformation (303) and subsequently bit-plane quantized according to an R-D optimized hexadeca-tree structure (304). Finally, an arithmetic encoder is applied (305) to produce a compressed representation of the light field (306).

The main contribution of the present invention are in the following modules illustrated in FIG. 3. 4D block partitioning (302), hexadeca-tree decomposition by Bit-planes (304) and arithmetic encoder (305). All of them are detailed below.

4D Block Partitioning

Figure 4:
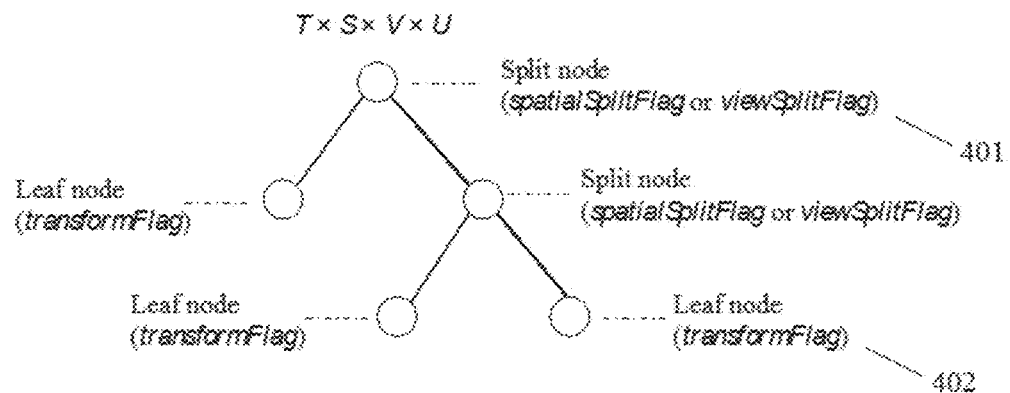
FIG. 4 discloses a general example of a 4D block partitioning tree.

The optimum partition of each block (302) is chosen among three different modes according to an R-D criterion based on Lagrangian costs. The cost is defined as $J=D+\lambda R$, where D is the distortion incurred when representing the original block by the quantized version (as further described in the hexadeca-tree module (304)) and R is the rate needed to encode it. The 4D partitioning is illustrated in FIG. 4 and is described below.

In the first mode, the whole block is transformed by a full-size 4D orthonormal transform (303) and the Lagrangian cost of encoding it ($J_T$) is evaluated.

Figure 5:
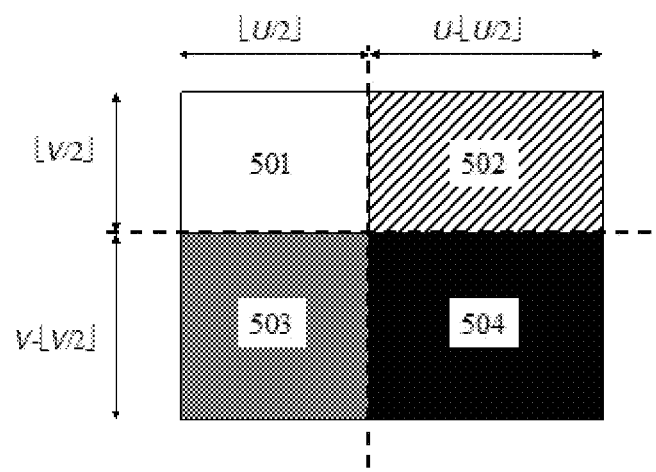
FIG. 5 discloses the 4D spatial partitioning scheme.

In the second mode, the block is partitioned in four sub-blocks each one with approximately a quarter of the pixels in the spatial dimensions, as shown in FIG. 5. Specifically, let us consider a block B of dimensions (T×S×V×U) (501, 502, 503, 504). This block will be subdivided in four sub-blocks $B_{00}$, $B_{01}$, $B_{10}$ and $B_{11}$ of sizes (T×S×⌊V/2⌋×⌊U/2⌋), (T×S×⌊V/2⌋×(U−⌊U/2⌋)), (T×S×(V−⌊V/2⌋)×⌊U/2⌋) and (T×S×(V−⌊V/2⌋)×(U−⌊U/2⌋)), respectively, where the mathematical function ⌊D/2⌋ is the flooring function of D/2, returning the largest integer that is less than or equal to D/2. The Lagrangian costs of the four sub-blocks are added to compute the Lagrangian cost $J_S$.

Figure 6:
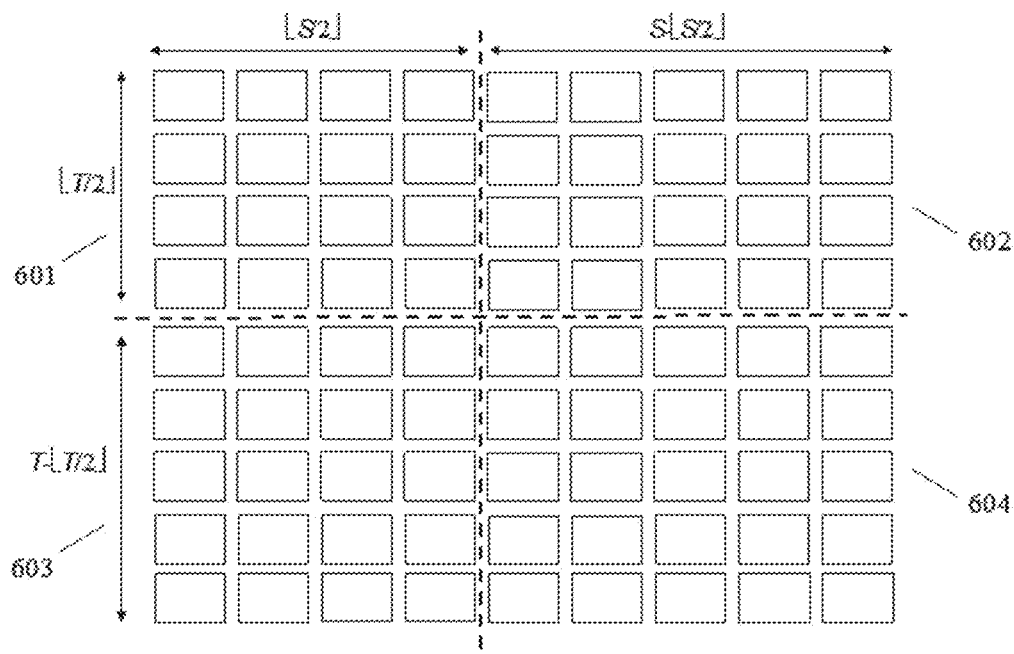
FIG. 6 discloses the 4D view partitioning scheme.

In the third mode, the block is partitioned into four sub-blocks each one with a quarter of the pixels in the view dimensions, as shown in FIG. 6. For example, let us consider again a block B of dimensions (T×S×V×U) (601, 602, 603, 604). This block will be subdivided in four sub-blocks $B_{00}$, $B_{01}$, $B_{10}$ and $B_{11}$ of sizes (⌊T/2⌋×⌊S/2⌋×V×U) (702), (⌊T/2⌋×(S−⌊S/2⌋)×V×U) (705), ((T−⌊T/2⌋)×⌊S/2⌋×V×U) (704), ((T−⌊T/2⌋)×(S−⌊S/2⌋)×V×U) (703), respectively. The Lagrangian costs of the four sub-blocks are added to compute the Lagrangian cost $J_V$.

Finally, the three Lagrangian costs ($J_T$, $J_S$ and $J_V$) are compared and the partition mode with the minimum cost value is chosen. If either $J_S$ or $J_V$ are the minimum costs, the partitioning optimization method is recursively applied in the sub-blocks, following the process previously described for the second and third modes. Otherwise, if $J_T$ is the minimum cost, the sub-block is no further partitioned and the transform is applied. This recursive method can be illustrated as the tree in FIG. 4.

Figure 7:
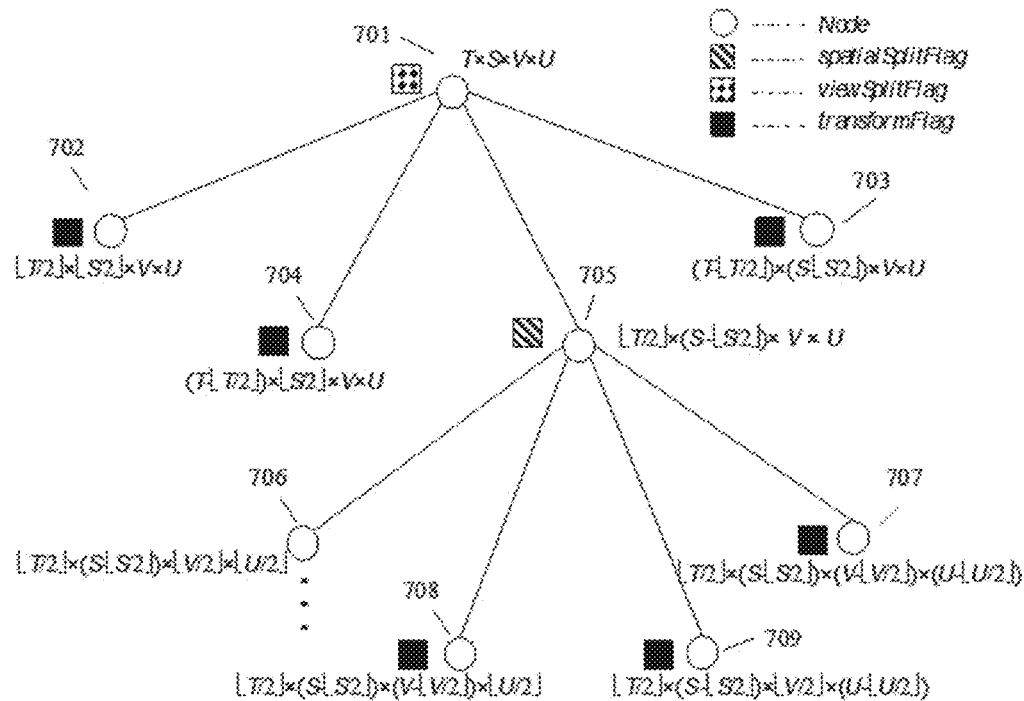
FIG. 7 describes an example of hierarchical 4D partitioning tree using the view split flag, the spatial split flag and the transform flag signaling that the node is a leaf node and will be no further partitioned.

An example of the recursive partition optimization method is show in FIG. 7, where the partition modes are represented as flags. The first partition mode is associated with the transformFlag (702, 703, 704, 707, 708, 709), which corresponds to the tree leaf nodes. The second partition mode is associated with the spatialSplifFlag (705), signaling that the sub-block must be split in the spatial dimensions (v,u). Finally, the thirds partition mode is associated with the viewSplifFlag (701), signaling that the sub-block must be split in the view dimensions (t,s).

Hexadeca-Tree Decomposition by Bit Planes

Figure 8:
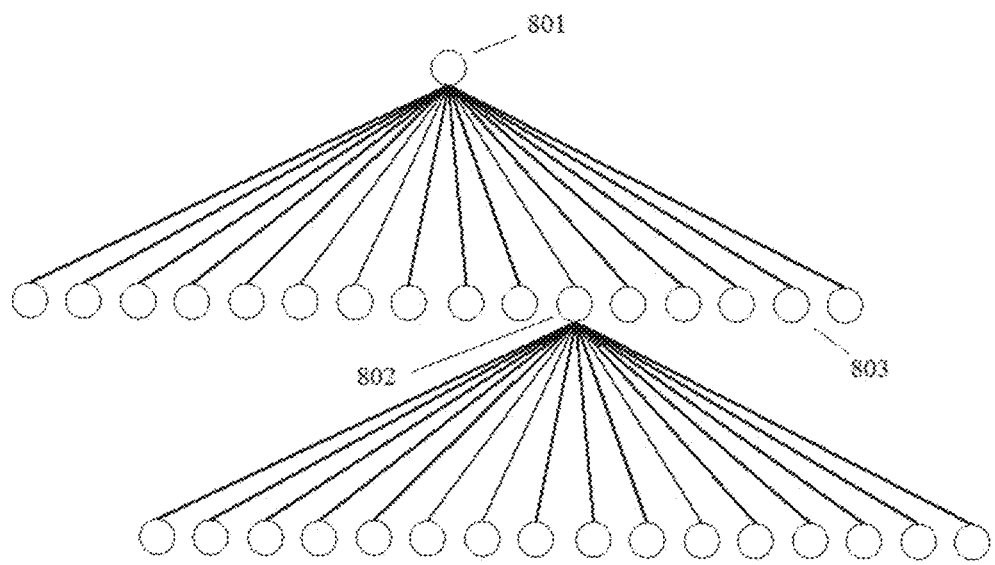
FIG. 8 discloses an example of hexadeca-tree partitioning.

The quantization (304) is done by bit-planes and rely on an R-D optimized hexadeca-tree structure, as illustrated in FIG. 8. The tree is segmented in an optimum way and the rate-distortion achieved depend heavily on the choice of this segmentation as well as on the data itself.

The hexadeca-tree is built by recursively subdividing a 4D block starting from the full block-size (T×S×V×U) and from the most significant bit-plane. The optimized decomposition works as follows: the full transformed input block is scanned, and all its coefficients are compared to a threshold given by $2^{bitplane}$. If the magnitudes of all of them are less than the threshold, the optimization procedure is recursively called with the same block as input, but with a bitplane value decreased by one (bitplane−1), and the Lagrangian cost $J_0$ is computed. However, if any coefficient is above the threshold, the block is segmented into up to 16 sub-blocks (801). The optimization procedure is recursively called for each sub-block and the returned Lagrangian costs are added to obtain the Lagrangian cost $J_1$. Another Lagrangian cost $J_2$ is evaluated, considering the resulting cost if the block was replaced by a block entirely composed of zeros. The minimum cost ($J_0$, $J_1$ or $J_2$) corresponds to the optimum decomposition mode for each hexadeca-tree node.

The three operations previously described in the decomposition process are detailed below:

i) Lower the bit-plane: in this case, the descendant of the node is another block with the same spatial dimensions of the original but with less spatial dimension in the bit-plane, represented with precision bitplane−1. This is used to indicate that, for the current block, all bits of the the current bit-plane and above bit-plane are zeros. This operation is selected when $J_0$ is the minimum cost.

ii) Split the block: in this case, the node will have up to 16 children (802), each one associated to a sub-block with approximately half the length of the original block in all four dimensions. This operation is selected when $J_1$ is the minimum cost. There are 16 possible sub-blocks, but depending on the size of the parent block, some of these descendant sub-blocks would have one or more of their lengths equal to zero and should be skipped. All descendants have the same bit-plane resolution of the parent. For example, a block B of size (T×S×V×U) can be split in the following sub-blocks:

$B_{0000}$ of size (⌊T/2⌋×⌊S/2⌋×⌊V/2⌋×⌊U/2⌋)
$B_{0001}$ of size (⌊T/2⌋×⌊S/2⌋×⌊V/2⌋×U−⌊U/2⌋)
$B_{0010}$ of size (⌊T/2⌋×⌊S/2⌋×V−⌊V/2⌋×⌊U/2⌋)
$B_{0011}$ of size (⌊T/2⌋×⌊S/2⌋×V−⌊V/2⌋×U−⌊U/2⌋)
$B_{0100}$ of size (⌊T/2⌋×S−⌊S/2⌋×⌊V/2⌋×⌊U/2⌋),
$B_{0101}$ of size (⌊T/2⌋×S−⌊S/2⌋×⌊V/2⌋×U−⌊U/2⌋)
$B_{0110}$ of size (⌊T/2⌋×S−⌊S/2⌋×V−⌊V/2⌋×⌊U/2⌋)
$B_{0111}$ of size (⌊T/2⌋×S−⌊S/2⌋×V−⌊V/2⌋×U−⌊U/2⌋)
$B_{1000}$ of size (T−⌊T/2⌋×⌊S/2⌋×⌊V/2⌋×⌊U/2⌋)
$B_{1001}$ of size (T−⌊T/2⌋×⌊S/2⌋×⌊V/2⌋×U−⌊U/2⌋)
$B_{1100}$ of size (T−⌊T/2⌋×⌊S/2⌋×V−⌊V/2⌋×⌊U/2⌋)
$B_{1101}$ of size (T−⌊T/2⌋×⌊S/2⌋×V−⌊V/2⌋×U−⌊U/2⌋)
$B_{1100}$ of size (T−⌊T/2⌋×S−⌊S/2⌋×⌊V/2⌋×⌊U/2⌋)
$B_{1101}$ of size (T−⌊T/2⌋×S−⌊S/2⌋×⌊V/2⌋×U−⌊U/2⌋)
$B_{1110}$ of size (T−⌊T/2⌋×S−⌊S/2⌋×V−⌊V/2⌋×⌊U/2⌋)
$B_{1111}$ of size (T−⌊T/2⌋×S−⌊S/2⌋×V−⌊V/2⌋×U−⌊U/2⌋)

iii) Discard the block: in this operation the node will have no descendants (803) and will be represented by an all-zeros block. This operation is selected when Jz is the minimum cost.

Arithmetic Encoder

Figure 9:
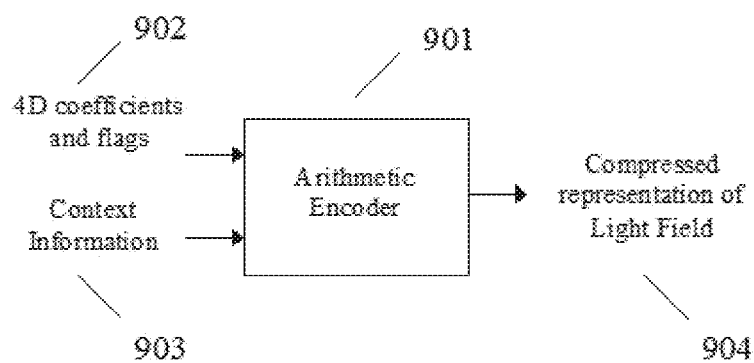
FIG. 9 discloses the block diagram of the arithmetic coder.
Figure 10:
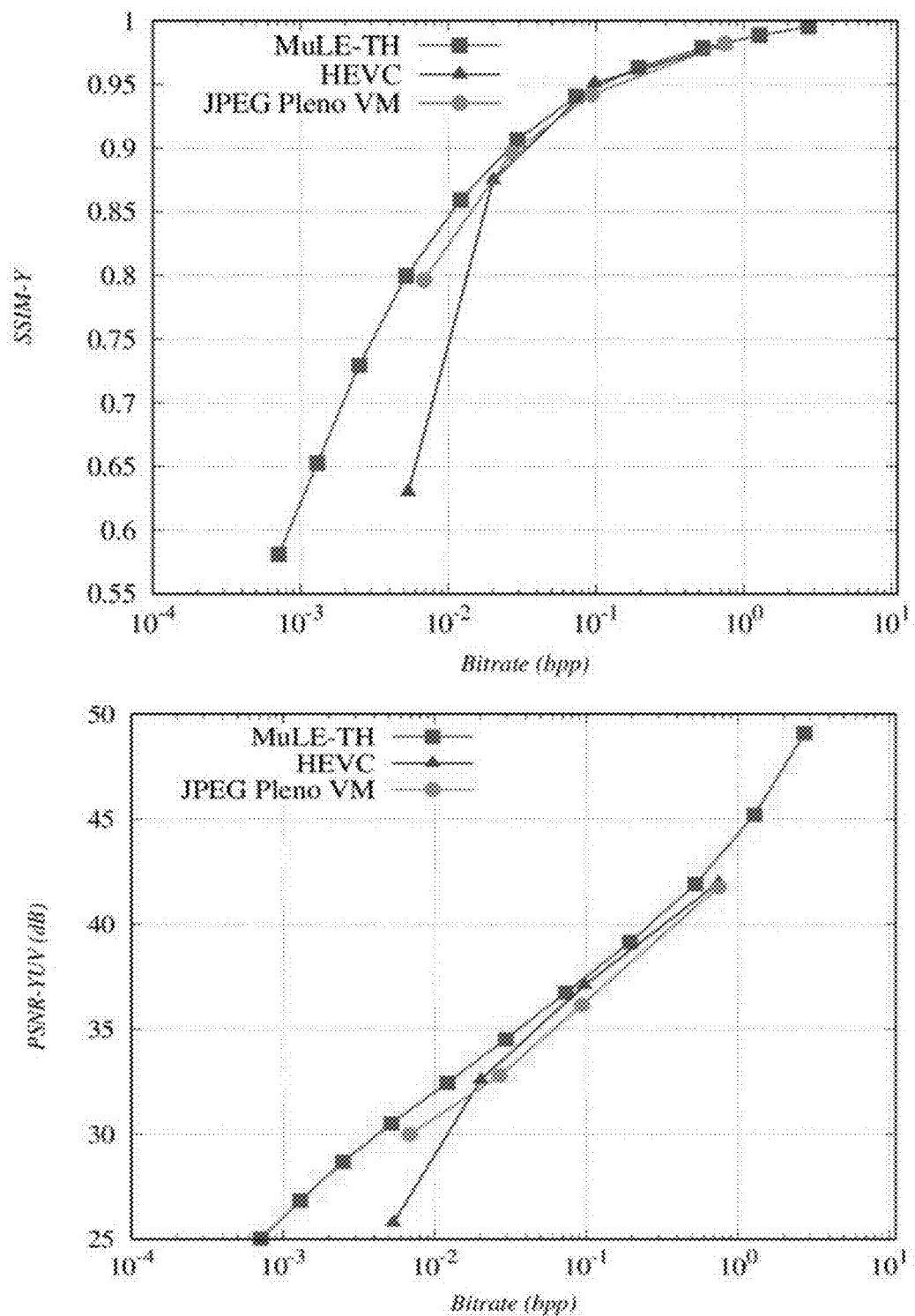
FIG. 10 depicts the PSNR-YUV and SSIM-Y rate-distortion curves for the exemplary Bikes dataset.
Figure 11:
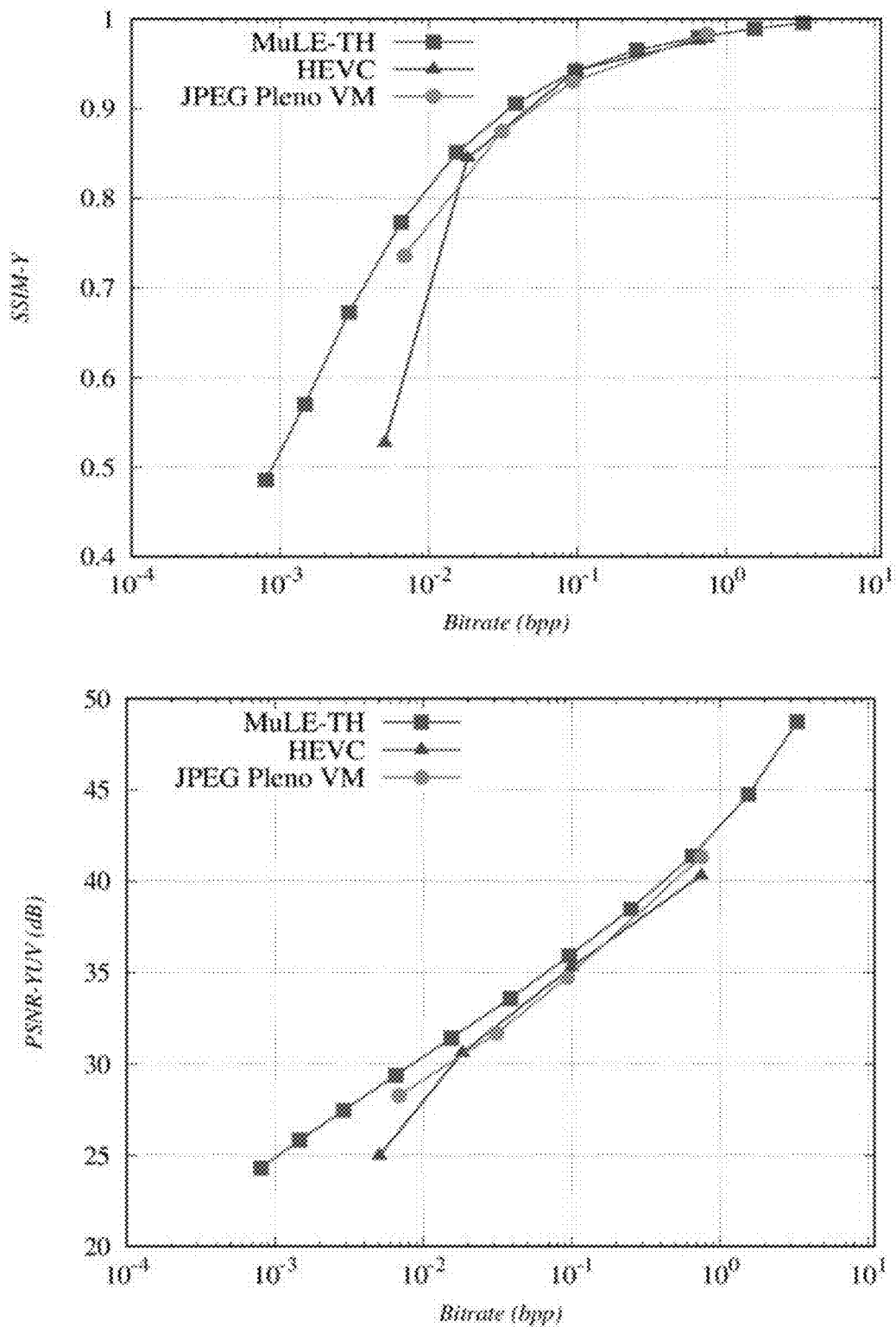
FIG. 11 depicts the PSNR-YUV and SSIM-Y rate-distortion curves for the exemplary Danger of Mort dataset.
Figure 12:
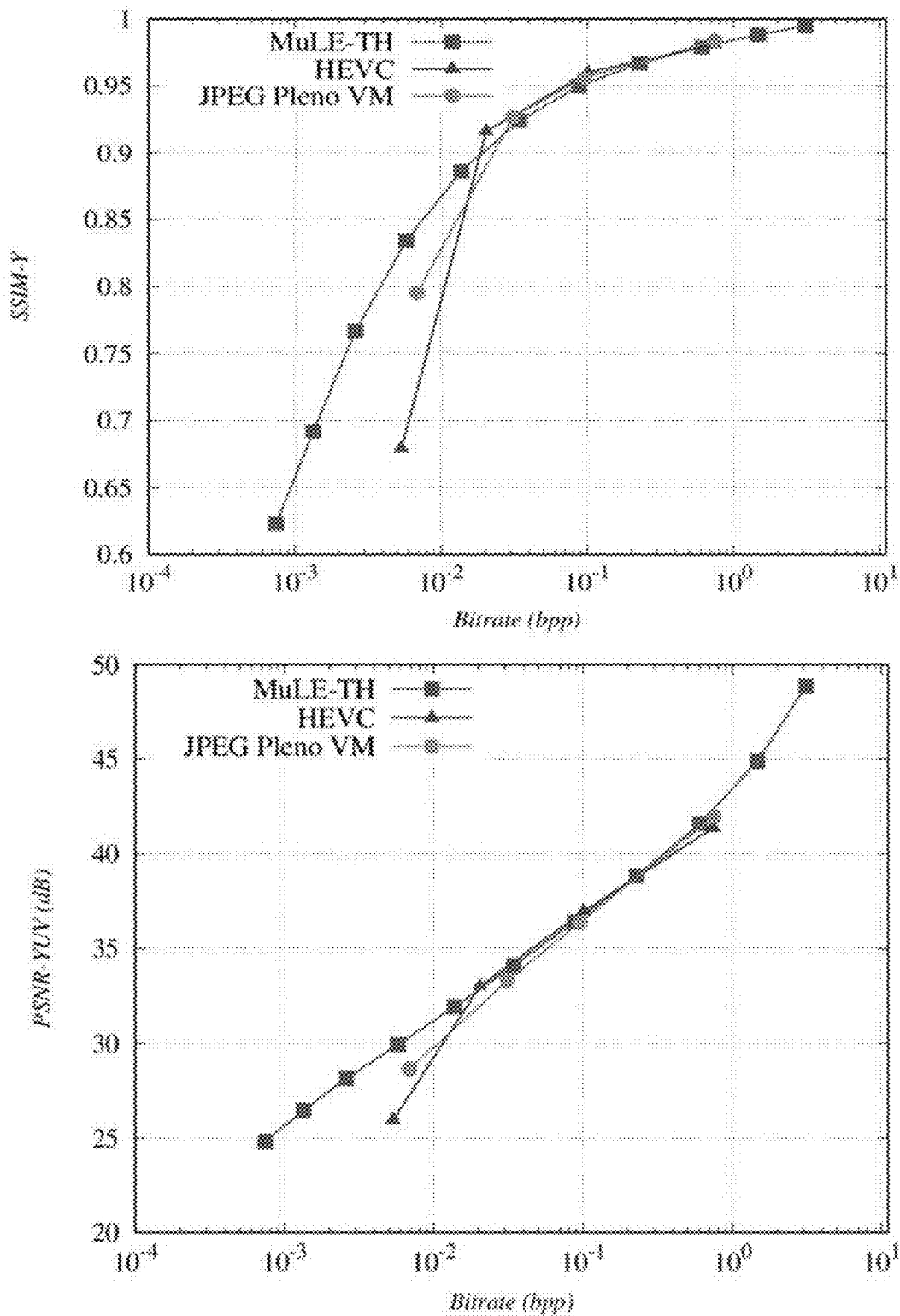
FIG. 12 depicts the PSNR-YUV and SSIM-Y rate-distortion curves for the exemplary Fountain & Vincent 2 dataset.
Figure 13:
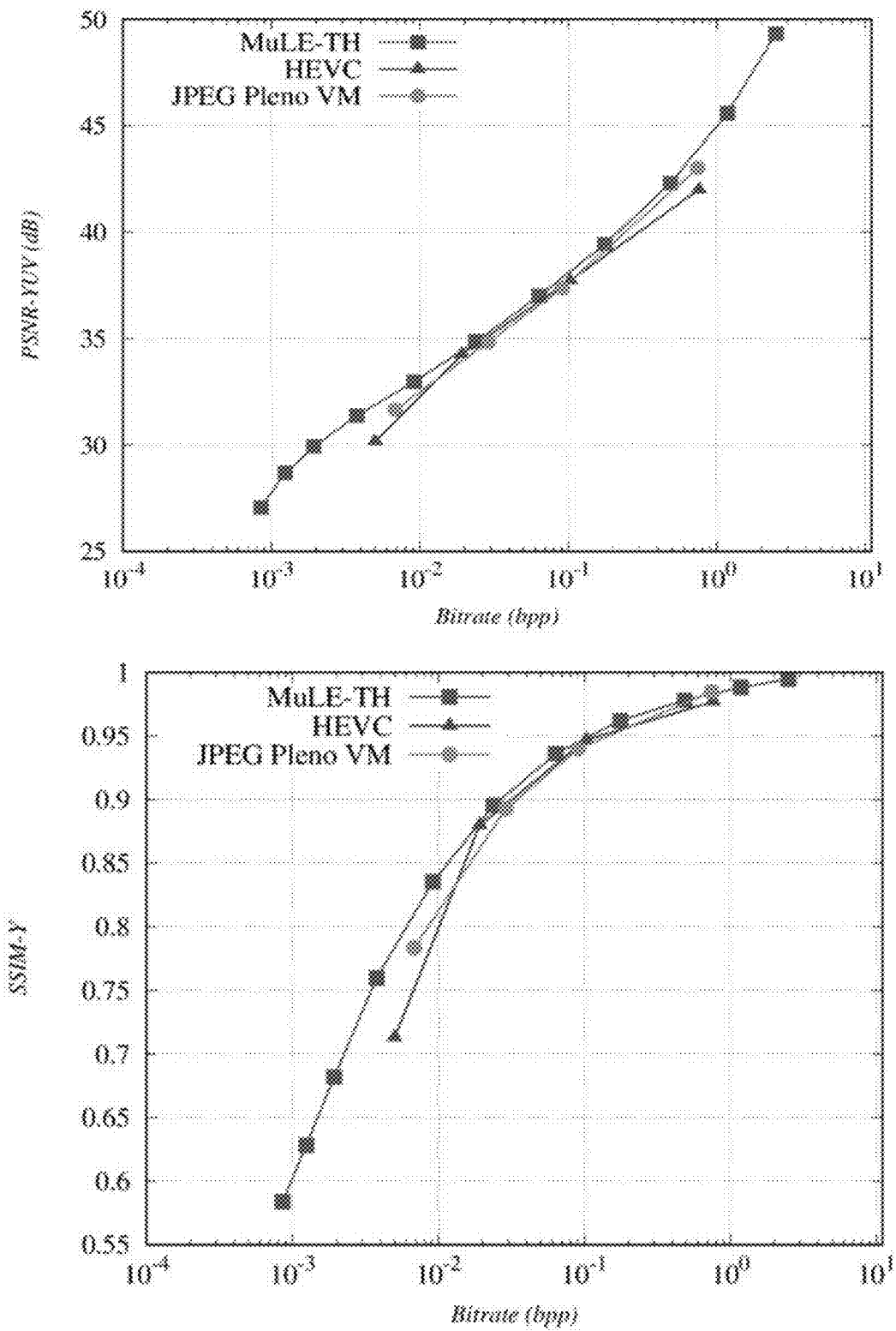
FIG. 13 depicts the PSNR-YUV and SSIM-Y rate-distortion curves for the exemplary Stone Pillars Outside dataset.

FIG. 9 shows the arithmetic encoder (901) that generates the final compressed representation of the light field (904). The bits of the 4D coefficients and flags (902) together with the probability context information (903) generated during the encoding process, are sent to the arithmetic encoder.

The arithmetic encoder (901) encodes the magnitude of each coefficient block one bit at a time employing a different context information (903) for each bit, ranging from all bit-planes. If the coefficient is not zero valued, its signal is encoded as well.

EXPERIMENTS AND RESULTS

The codec implementation of the present invention has been assessed against the specific prior art light field compression and with the technique HEVC (ITU-T & ISO/IEC. High Efficiency Video Coding, Rec. ITU-T H.265 and ISO/IEC 23008-2, 2013) and *JPEG Pleno Verification Model* 1.0 (ISO/IEC JTC 1/SC29/WG1N80028, *JPEG Pleno Light Field Coding VM* 1.0, July 2018) in accordance with the JPEG Pleno Common Test Conditions document (ISO/IEC JTC 1/SC29/WG1N80027. JPEG PLENO LIGHT FIELD CODING COMMON TEST CONDITIONS, July 2018).

The densely sampled datasets from the JPEG Pleno Common Test Conditions document have been used. These light field datasets are known as: Bikes, Danger de Mort, Fountain&Vincent2 and Stone Pillars Outside. Each dataset has 4D dimensions of 13×13×625×434 (T×S×V×U). Considering FIG. 2, the views vertical direction is the T axis, the views horizontal direction is the S axis, the spatial vertical direction is the V axis and the spatial horizontal direction is the U axis. The present invention used the value of 13 as the maximum transform size in the views vertical direction, the value of 13 as the maximum transform size in the views horizontal direction, the value of 31 as the maximum transform size in the spatial vertical direction and the value of 25 as the maximum transform size in the spatial horizontal direction.

Results show that MuLE-MTH is competitive with VM 1.0 and with HEVC anchors (x265.org) for the densely sampled datasets, as corroborated by the following Rate-Distortion curves. When analyzing the R-D curves, one can verify that the present invention presents the best R-D performance for densely sampled light fields without relying on any depth information. These curves show the different quality levels (PSNR-YUV and SSIM-Y) of the decoded light field for a number of bitrates (in bits per pixel—bpp). The PSNR (Peak Signal-to-Noise Ratio) and SSIM (Structural SIMilarity index) are metrics commonly used to measure the quality of reconstruction of lossy compression codecs. The PSNR-YUV assesses the quality reconstruction of all YUV components (color) and the SSIM-Y shows the SSIM value for the luminance (Y) component only, both as defined in the JPEG Pleno Common Test_Conditions document.

Although the present invention has been described with respect to certain preferred embodiments, it is to be understood that it is not intended to limit the invention to these particular embodiments. Rather, it is intended to encompass all possible alternatives, modifications and equivalences within the spirit and scope of the invention as defined by the appended claims.

The invention claimed is:

1. A method for compressing light field data using variable block-size four-dimensional transform and bit-plane hexadeca-tree decomposition, comprising:
    partitioning four-dimensional pixel data of a light field into four-dimensional blocks of independent fixed size;
    partitioning the four-dimensional blocks in a set of four-dimensional non-overlapping sub-blocks of different sizes according to a rate-distortion criterion;
    independently transforming the four-dimensional sub-blocks generated in the partitioning the blocks operation, using a four-dimensional transform;
    quantizing by bit-planes the sub-blocks transformed by the four-dimensional transform according to rate-distortion optimized hexadeca-tree structure; and
    encoding the four-dimensional quantized data generated through an arithmetic encoder to produce a compressed representation of the light field.

2. The method according to claim 1, wherein adaptive partitioning of the four-dimensional blocks is determined as ideal in a rate-distortion detection using a Lagrange cost method.

3. The method according to claim 1, wherein adaptive partitioning of the four-dimensional blocks can be performed in three forms defined as: partitioning on spatial dimension, partitioning on view dimension, and without partitioning.

4. The method according to claim 1, wherein the hexadeca-tree structure is constructed so that quantized data are encoded in four dimensions in an optimally manner in the fee-distortion detection using a Lagrange cost method.

5. The method according to claim 4, wherein the hexadeca-tree structure is optimally decomposed by the following operations: reducing the bit-plane, dividing the block, and discharging the block.

6. The method according to claim 1, wherein an entropy encoder used is an adaptive arithmetic encoder.

7. The method according to claim 1, further comprising exploiting a total 4D redundancy using a 4D transform.

8. The method according to claim 2, wherein adaptive partitioning of the four-dimensional blocks can be performed in three forms defined as: partitioning on spatial dimension, partitioning on view dimension, and without partitioning.

* * * * *

UNITED STATES PATENT AND TRADEMARK OFFICE
CERTIFICATE OF CORRECTION

PATENT NO. : 10,687,068 B1  
APPLICATION NO. : 16/380600  
DATED : June 16, 2020  
INVENTOR(S) : Eduardo Antônio Barros Da Silva et al.

Page 1 of 1

It is certified that error appears in the above-identified patent and that said Letters Patent is hereby corrected as shown below:

On the Title Page

Item [30] (Foreign Application Priority Data), Line 1, Delete "102019000922" and insert -- 1020190009225 --, therefor.

Signed and Sealed this  
Twenty-eighth Day of July, 2020

Andrei Iancu  
*Director of the United States Patent and Trademark Office*